United States Patent Office 3,634,303
Patented Jan. 11, 1972

3,634,303
DISPERSIONS OF FINELY-DIVIDED POLY-
(EPOXIDES) IN NONPOLAR ORGANIC
DILUENTS
Edwin J. Vandenberg, Foulk Woods, Wilmington, Del.,
assignor to Hercules Incorporated, Wilmington, Del.
No Drawing. Filed June 2, 1969, Ser. No. 829,731
Int. Cl. C08g 51/26, 53/18; C08j 1/46
U.S. Cl. 260—33.2 EP                    20 Claims

ABSTRACT OF THE DISCLOSURE

Dispersions of poly(epoxides) in nonpolar liquid organic diluents, wherein the poly(epoxide) has a particle size of 0.05 to 20 microns, are described. These dispersions are prepared by polymerizing an oxirane or oxetane or mixtures of such epoxides in a diluent, in which the polymer being produced is insoluble, in the presence of a poly(epoxide) microgel which is swollen at least 100% by the diluent. Suitable microgels are prepared by copolymerizing a monoepoxy monomer with a small amount of a polyepoxy monomer whereby a network structure is formed.

---

This invention relates to dispersions of finely-divided poly(epoxides) in nonpolar liquid organic media and to the process of preparing these dispersions.

It is well known that monomeric compounds containing an oxirane or oxetane group can be polymerized and copolymerized wherein polymerization takes place through the epoxide group to produce valuable polyethers. In general, hydrocarbon-insoluble polyethers such as epichlorohydrin homo- and copolymers, poly(ethylene oxide), isotactic poly(phenyl glycidyl ether), poly[3,3-bis(chloromethyl)oxetane], etc. when polymerized in a hydrocarbon or other nonsolvent lead to a coating of the polymer on the reaction vessel and/or the formation of large agglomerates with little or no dispersion of the polymer. Because of the difficulty of recovering the polymer under such circumstances, these polymerizations are generally carried out in solution. While such procedures are effective there are many obvious disadvantages in them, particularly in the recovery of the polymer in an easily handleable form. In addition, for coatings and many other applications, it has previously been possible to apply these polyethers only by utilizing melt or solution techniques.

Now in accordance with this invention, a process has been discovered whereby the poly(epoxides) are obtained as a dispersion in a nonpolar liquid organic medium, which dispersion can be in the form of very finely divided particles, i.e., a particle size of 1 to 3 microns or less, or as a coarse particle slurry. The new polyether dispersions of this invention are obtained by polymerizing one or more epoxides, which can be oxiranes and/or oxetanes, in a nonpolar liquid organic diluent in the presence of a polyether microgel which is swollen by said diluent. As will be appreciated, there are many advantages in producing the polymer in the form of a dispersion. One such processing advantage is the ability to polymerize to a much higher solids content than is possible in a solution process because of the high viscosity encountered in the latter method. In addition, the dispersions per se have applications that were not readily attained with the polymer derived from a solution process, particularly in the case of elastomeric polymers and polymers that had been cross-linked and hence insolubilized. Because the polymer is present in these dispersions as discrete particles, it is possible to separate them by centrifugation, filtration, etc. The resultant product, having a much smaller particle size than was possible to obtain by grinding or other means of dividing the polymer mass from a solution process, can be utilized in processes not previously available to these polymers. For example, the elastomeric and/or cross-linked poly(epoxides) can now be dry blended with other polymers, such as polyvinyl chloride, to increase the impact strength thereof. Another advantage of these new dispersions is that they can readily be converted to an aqueous dispersion or latex, which is highly useful.

In this specification and claims the terms "polyether" and "poly(epoxide)" are used interchangeably to denote the polymers produced by polymerization of an oxirane and/or oxetane wherein polymerization takes place by ring opening of the epoxy group, which polymers are, of course, a specific class of polyethers.

Any poly(epoxide) can be produced in accordance with this invention in the form of a dispersion of finely divided particles of the polymer in a nonpolar liquid organic diluent in which it is insoluble and by which it is relatively unswollen, i.e., to less than 50% and preferably less than 25% of the polymer's unswollen volume. Exemplary of the poly(epoxides) that are insoluble in and relatively unswollen by nonpolar organic media are the homopolymers of epihalohydrins such as epichlorohydrin, epibromohydrin, epifluorohydrin, etc., and copolymers of epihalohydrins with one another or with one or more other oxiranes or oxetanes, homopolymers and copolymers of styrene oxides, such as styrene oxide, and halo, methyl, ethyl and phenyl substituted styrene oxides, homopolymers and copolymers of ethylene oxide, homo- and copolymers of oxetanes such as trimethylene oxide, 3,3-bis(halomethyl)oxetanes, 3,3 - diphenyloxetane, 3,3 - dimethoxyoxetane, homo- and copolymers of highly halogenated epoxides such as cis- and trans-1,4-dihalo-2-butene oxides, 1,1,1-trihalo-2,3-epoxypropanes, 1,1,1-trihalo-3,4-epoxybutanes, 1,1,1-trihalo-4,5-epoxypentanes, 1,2-dichloro-3,4-epoxybutane, etc. The polymers can be crystalline or amorphous. In the case of those polyethers where only the crystalline form is insoluble, the process of this invention can be utilized for the preparation of dispersions of these crystalline polyethers, provided that the polymerization catalyst and conditions are such that the crystalline polymer is produced. Exemplary of such polyethers are the polymers of phenyl glycidyl ether, halo-, lower alkyl (e.g., 1 to 4 carbon atoms), and aryl-substituted phenyl glycidyl ethers, cis- and trans-2-butene oxides, butadiene monoxide, and tert-butyl ethylene oxide. Another group of polymers insoluble in nonpolar organic media are the copolymers of monoepoxy monomers with from 0.1 to 20% by weight of a polyepoxy monomer, i.e., an oxirane or oxetane containing more than one epoxy group, such polymers being at least partially cross-linked and hence insoluble and relatively unswollen by the nonpolar diluent. Exemplary of such polymers are copolymers of the above named monoepoxy monomers with polyepoxy monomers such as diolefin dioxides like butadiene dioxide, 4-vinyl cyclohexene dioxide, cyclooctadiene dioxide, and others as further enumerated below.

As pointed out above, the finely divided polyether dispersions of this invention are prepared by polymerizing at least one epoxide in a nonpolar liquid organic diluent in the presence of a polyether microgel which is swollen by said diluent. The polyether microgel can be any, at least partially, cross-linked poly(epoxide) structure of microdimensions in a nonpolar liquid organic medium in which the microgel is swollen at least 100% and preferably at least 200% up to 1000% or more of the unswollen volume of the polymer. The microgel can be a network structure formed by covalent bond cross-links, such as are obtained when a monoepoxy monomer is copolymerized with a polyepoxy monomer or with a monoepoxy monomer containing a second and different functional group which can subsequently yield a microgel network structure, or those formed by secondary valence-type bonding such as is involved in crystallization-type cross-links. It is believed that the polymerization takes place in the microgel with the microgel encapsulating the polymer as it is formed, thereby preventing the polymer from agglomerating and hence acting as a dispersant for the poly(epoxide) polymer particles. Whatever the reason or theory may be, it has been found that for the production of very finely divided dispersions, the microgel should have a major amount of groups which have a strong affinity for the organic media being used for the polymerization. In the case of aliphatic or cycloaliphatic hydrocarbon diluents, the microgel will contain a substantial proportion of such hydrocarbon groups, preferably long chain alkyl groups in order to assure a sufficient degree of swelling of the microgel in the polymerization diluent. The preparation of the microgel can be carried out as a separate operation and introduced into the polymerization system at the beginning of the main polymerization or in increments throughout the main polymerization. Generally, the microgel will be formed as a first step or prepolymerization step with the main polymerization then being carried out as a second step in the same vessel. Prepolymerization conditions such as time, temperature and concentration will preferably be chosen to completely polymerize the premonomer(s) to the microgel.

For purposes of discussion herein, the preparation of the microgel will be referred to as the prepolymerization and the epoxy monomer(s) used for the preparation of the microgel as premonomers. The polymerization of the epoxide(s) being polymerized to produce the dispersed polymer will be referred to as the main polymerization and the epoxy monomers used therefor as the main monomers.

One method of preparing a poly(epoxide) microgel useful in the production of the dispersions of this invention is by copolymerization of one or more monoepoxy monomers with one or more polyepoxy monomers in a nonpolar liquid organic diluent in which the poly(epoxide) microgel formed is swollen by at least 100%. In the preparation of such a microgel, at least 50% of the monoepoxy premonomers will contain at least 3 carbon atoms and will be selected from olefin monoxides containing at least 3 carbon atoms, glycidyl or oxetanyl ethers of alcohols containing at least 3 carbon atoms or of phenols, and hydrocarbyl-substituted oxetanes wherein the total number of carbon atoms is at least 4. For very fine particle dispersions, i.e., less than about 10 microns and preferably less than 5 microns, the major portion of the monoepoxy premonomers will preferably contain from 6 to 30 carbons. For coarser particle dispersions, i.e., in the 10 to 20 micron range, the major portion of the monoepoxy premonomers can contain at least 3 carbon atoms and preferably will contain 3 to 5 carbon atoms. The remainder, if any, of the monoepoxy premonomers can be any desired monoepoxy monomer. Exemplary of the monoepoxy monomers containing at least 3 carbon atoms and comprising the major portion of the monoepoxy premonomers are olefin oxides such as propylene oxide, butene-1 oxide, pentene-1 oxide, hexene-1 oxide, dodecene-1 oxide, octadecene oxide, eicosene oxide, tricosene oxide, cis- or trans-olefin oxides having the formula

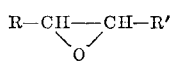

where R and R' are alkyl, alkaryl, cycloalkyl, aralkyl or alkcycloalkyl and may be alike or different such as cis- and trans-butene-2 oxide, p-dodecylstyrene oxide, cyclohexene oxide, cyclohexylethylene oxide, α-pinene epoxide, dipentene epoxide, etc.; epoxyalkyl ethers having the formula

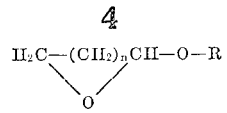

where $n=0$ or 1 and R is an alkyl group containing at least 3 carbon atoms, aryl, alkaryl, cycloalkyl, alkcycloalkyl, or aralkyl such as propyl glycidyl ether, hexyl glycidyl ether, decyl glycidyl ether, octadecyl glycidyl ether, cyclohexyl glycidyl ether, phenyl glycidyl ether, benzyl glycidyl ether, etc., and the corresponding oxetanyl, i.e., 2,4-epoxybutyl, ethers; and 2- or 3-hydrocarbyl-substituted oxetanes, such as 2- or 3-alkyloxetanes where the alkyl group contains 1 to 15 (or more) carbon atoms, 2- or 3-cycloalkyl oxetanes, 2- or 3-cycloalkylmethyl oxetanes, 2- or 3-aralkyl oxetanes, 2- or 3-alkaryl oxetanes, etc.

The cross-linking comonomer used in the prepolymerization step to prepare the microgel and/or the main polymer can be any oxirane or oxetane containing two or more oxirane and/or oxetane groups which may be terminal or internal epoxide groups. Exemplary of such polyfunctional epoxides are diterminal olefin dioxides such as butadiene dioxide, 1,5-hexadiene dioxide, 1,9-decadiene dioxide, etc., up to linear $C_{30}$ diolefin dioxides; diterminal olefin dioxides having one or more internal epoxide groups such as 1,8,17-octadecatriene trioxide, 1,4,7-octatriene trioxide, etc.; diolefin dioxides containing a terminal and internal epoxide group such as 4-vinyl cyclohexene dioxide; di- (or tri-) olefin di- (or tri-) oxides containing all internal epoxide groups such as cyclooctadiene dioxide, cyclododecatriene di- and trioxides; glycidyl ethers and substituted glycidyl ethers of polyols such as ethylene glycol, diethylene glycol, propylene glycol, glycerin, pentaterythritol, bisphenol, hydroquinone, resorcinol, the glycidyl ether of p-(diglycidylamino)-phenol, 1,1,1-trimethylol propane, etc.; dioxetanes such as 1,3- and 6,8-diepoxyoctane, 1,3- and 8,10-diepoxydecane, 1,3- and 4,6-diepoxyhexane, 1,3-bis(2-oxetanyl)propane, etc.; and polyfunctional compounds containing both an oxirane and an oxetane group such as 1,3- and 7,8-diepoxyoctane, 1,3- and 9,10-diepoxydecane, 1,3- and 5,6-diepoxyhexane, 1-(3-oxetanyl)-4,5-epoxypentane, etc. The amount of cross-linking agent used in the preparation of the microgel will preferably be from about 0.05% to about 30% by weight of the premonomers and more preferably will be 0.2% to about 15%.

In addition to the monoepoxide and di- or polyepoxide premonomers, it is frequently advantageous to include in the preparation of the microgel an amount (1 to 50% of the weight of the total premonomers) of a monomer which is identical to or similar in polarity to the monomer(s) being ultimately polymerized as for example including a small amount of epichlorohydrin in the preparation of the microgel to be used for the homo- or copolymerization of epichlorohydrin or ethylene oxide in the preparation of poly(ethylene oxide) or copolymers of high ethylene oxide content.

Another method of preparing the microgel used as the dispersant in the main polymerization is to prepare a microgel in which the cross-links are formed by secondary valence-type bonding such as in crystallization-type cross-links. Again, the microgel-forming polyether must be one which is insoluble in the nonpolar liquid organic diluent, but which is highly swollen by the diluent. Any stereoblock polymer of an oxirane can be used provided that it has blocks or segments of stereoregularity combined with segments which are not ordered, e.g., atactic, which are amorphous and soluble in the nonpolar liquid organic diluent. The stereoblock polymer can be a homopolymer with such segments or a copolymer of an oxirane that forms stereoregular blocks with a different monomer which forms blocks of random order and hence contribute the desired degree of solubility, i.e., swelling. In general the stereoblock polymer will be of low crystallinity, i.e., 1–25% and preferably 5–25% crystalline, in the nonpolar liquid organic diluent and hence swollen by the diluent.

Oxiranes which can be homopolymerized or copolymerized to suitable microgels having crystalline-type cross-links are cis- and trans-2-butene oxides, phenyl glycidyl ether, and alkyl- and halo-substituted phenyl glycidyl ethers, tert-butyl ethylene oxide, etc.

The amount of microgel, its composition and method of preparation will, of course, depend on the monomer(s) ultimately being polymerized. Preferably, the amount of the microgel will be from about 0.5 to about 25% by weight of the final polymer present in the slurry or dispersion and, more preferably, will be about 1 to 20%. The microgel can be made in dilute or concentrated solution at low or high temperature and by batch or continuous methods. Preferably, the microgel will be made with at least ten times as much of the nonpolar liquid organic diluent as the epoxides being polymerized and more preferably 20–30 times as much diluent. Any epoxide polymerization catalyst can be used for the preparation of the microgel and it can be the same or different from the one used in the main polymerization. A chain transfer agent such as described in U.S. 3,313,743 is advantageously included in the microgel preparation and also in the subsequent polymerization process. This is particularly the case when a concentrated microgel is prepared or when a very finely divided dispersion is desired, again depending on the monomer(s) ultimately polymerized.

Like the prepolymerization reaction (preparation of the microgel), the main polymerization can be carried out under a wide variety of conditions. The choice of the temperature, time, concentrations, amount of catalyst, etc. will of course depend on the monomer or monomers being polymerized, and the catalyst used. The process can be operated as a batch or continuous process. Either mild or vigorous agitation can be used and depending on the other conditions and type of product desired.

The diluent used for the preparation of the microgel and also for the main polymerization can be any nonpolar liquid organic diluent in which the polymer being prepared is insoluble and by which it is relatively unswollen, i.e., to less than 50% and preferably less than 25% of the polymer's unswollen volume at the polymerization temperature. While aliphatic and cycloaliphatic saturated hydrocarbons are generally preferred, aromatic hydrocarbons, alkenes and cycloalkenes can also be used as well as mixtures of any of these hydrocarbons. Other nonpolar inert diluents that can be used are aliphatic ethers such as diethyl ether, diisopropyl ether, etc.; monochlorohydrocarbons such as butyl chloride, amyl chloride, 1-chlorohexane, octyl chloride, etc. Small amounts, i.e., 1 to 20%, of nonreactive diluents can also be included, as for example, chlorinated hydrocarbons such as methylene chloride, chloroform, chlorobenzene; ethers such as dioxane, tetrahydrofuran; and nitriles such as acetonitrile.

Any epoxide polymerization catalyst can be used for the prepolymerization and for the main polymerization reaction and it can be the same for both polymerizations or different. Exemplary of the epoxide polymerization catalysts that can be used are the organoaluminum catalysts which have been reacted with water and/or a chelating agent such as are used and described in U.S. Patents Nos. 3,135,705 and 3,135,706, and U.S. 3,219,591, and alcohol modifications thereof such as described in U.S. 3,280,045, combinations of aluminum alkyls with diols and tetrahydrofuran as described in U.S. 3,058,923, with ammonia or other nitrogen compounds as described in U.S. 3,186,958, or with a trialkyl orthovanadate as described in U.S. 3,218,269. Other catalysts that can be used are zinc dialkyls reacted with water, a glycol or a polyhydric phenol as described in British Patent 927,817, or magnesium dialkyls reacted with a polyreactive compound such as ammonia, water, a glycol, polyhydric phenol, etc., as described in U.S. 3,415,761. Combinations of these catalysts can also be used, as for example, those described in French Patent 1,540,239. Still other modifications of organometallic epoxide polymerization catalysts that can be used are those described in U.S. Patents Nos. 3,399,150 and 3,427,259, and Belgian Patent 633,621. Obviously many other modifications are equally useful. Also useful are catalysts based on combinations of aluminum alkoxides such as aluminum triisopropoxide with zinc chloride, zinc acetate, or titanium or chromium acetates, etc. and the related catalysts described by Osgan et al., J. Polymer Science, Part B, 5,789 (1967), and Belgian Patent 680,456; as well as catalysts based on or derived from calcium and calcium amide as described in U.S. Patents Nos. 2,969,402, 3,037,943, 3,062,755, 3,100,750, 3,127,358 and 3,141,854. In general, the organometallic catalysts are preferred. The amount of the catalyst used will depend on the monomer(s) being polymerized, the polymerization conditions being used, etc., but can be any amount from a small catalytic amount up to a large excess but in general will be within the ranges specified in the above references. As already stated, the catalyst can all be added in the prepolymerization step or part can be added at that time and additional catalyst added when the main polymerization reaction is carried out or it can be added continuously or in increments throughout the polymerization.

While dispersion aids such as surface-active materials and/or block or graft polymers are not generally needed to obtain a stable product dispersion, such agents can be added if desired. For example, any surface-active agent and/or block or graft polymer composed of both polar and nonpolar groups which are soluble or dispersible in the polymerization medium can be used. They can be added prior to the microgel formation, or before, during, or after the main polymerization. Surface-active materials that can be so used are the ethylene oxide adducts of fatty alcohols, rosins and hydrogenated rosins, etc., and block or graft polymers of hydrocarbon-soluble and hydrocarbon-insoluble poly(epoxides).

The polyether dispersions of this invention can be used as such after addition of stabilizers, fillers or any other desired additive such as cross-linking agents. The dispersions can also be transferred with appropriate emulsifiers to an aqueous medium to give, after removing the organic diluent, aqueous emulsions. The polymer can be recovered from the dispersions by any of the usual means. In the case of the large particle dispersions, the polymer can be recovered by filtration, centrifugation, or any other desired means. In the case of the very fine particle dispersions, it is usually preferable to coagulate them by addition of alcohol, steam, etc., and then recover the polymer as in the slurry systems. The dispersions can, of course, also be concentrated by creaming, centrifugation, stripping and any of the other means known in the art.

The following examples will illustrate the preparation of the new polyether dispersions of this invention. All parts and percentages are by weight unless otherwise indicated. The RSV (a measure of molecular weight) of the polymer, where isolated, is determined on a 0.1% solution in $\alpha$-chloronaphthalene containing 3% acetylacetone at 100° C. unless otherwise indicated.

EXAMPLES 1–17

In each of these examples and the controls, 20 parts of epichlorohydrin or of the indicated epichlorohydrin-ethylene oxide mixture was polymerized in 63–67 parts of n-heptane as diluent. In each case, a polymerization vessel with a nitrogen atmosphere was charged with the diluent, the catalyst was added and the pure monomers used in the preparation of the dispersant microgel were added and the prepolymerization reaction (if any) carired out for the given time and temperature. The monomer(s) for the main polymerization was then added and the polymerization continued. The catalyst used in Control 1 and Example 1 (Tibal) was 1.6 and 0.8 parts, respectively, of triisobutylaluminum which had been reacted at 0.5 M concentration in 50–50 n-heptane-ether with 0.5 mole of water per mole of aluminum, added during 1 hour at 20–25° C.

and then stirred at 25° C. for 20 hours. In Example 2, the catalyst used (Teal I) was 0.9 part of triethylaluminum which had been reacted, at a 25% concentration in the toluene containing 6 moles of ether per mole of aluminum, with 0.5 mole of water at 0° C. and then with 0.5 mole of acetylacetone per mole of aluminum and stirred for 10 hours at 25° C. In Controls 2, 3 and 4 and Examples 3–5, the catalyst used (Teal II) was like Teal I except that in its preparation instead of 6 moles of ether per aluminum, there was used 6 moles of tetrahydrofuran per aluminum and in Examples 3–5 only half the amount of catalyst was used, i.e., 0.45 part of triethylaluminum. In Examples 6–17, the catalyst used (Teal III) was prepared by reacting a catalyst prepared like Teal II but with 0.4 mole instead of 0.5 mole of acetylacetone with 0.1 mole of tetrahydrofurfuryl alcohol and after the 25° C. reaction, the catalyst was heat treated at 65° C. for 10 hours. The amount of catalyst used was 0.23 part of triethylaluminum except in Example 8 where 0.35 part was used. Tabulated below (Table I) are the catalyst used, monomers and parts thereof used in the preparation of the dispersant microgel, the reaction conditions and description of the product. At the end of the polymerization, 2 parts of anhydrous ethanol was added as shortstop and the particle size of the polymer dispersions was determined by microscopic examination. The polyepichlorohydrin produced in Example 1 was isolated by adding ether to the reaction mixture, washing the mixture twice with 3% aqueous hydrogen chloride, washing with water until neutral, collecting the ether-insoluble, washing it with ether and then with ether containing 0.05% of Santonox, i.e., 4,4'-thiobis(6-tert-butyl-m-cresol), after which the polymer was dried for 16 hours at 80° C. under vacuum. The epichlorohydrin-ethylene oxide copolymers were isolated by diluting the reaction mixture with ether, separating the ether insoluble and washing with ether. The ether-insoluble polymer was further purified by slurrying with anhydrous ethanol, washing with 1% hydrogen chloride in ethanol, washing with methanol until neutral and then with a 0.4% solution of Santonox in methanol and finally it was dried for 16 hours at 80° C. under vacuum.

The following abbreviations are used in the table:

ECH=epichlorohydrin
EO=ethylene oxide
$C_{16-18}$, $C_{15-18}$=a mixture of linear 1-olefin oxides of 16 to 18 (or 15 to 18) carbon atoms and containing about 1% of a terminal diolefin dioxide in the same molecular weight range
Pure $C_{15-18}$ oxide=same as above but containing no diolefin dioxide
$C_7$ oxide=pure 1-heptene oxide
$C_{16}$ oxide=pure 1-hexadecene oxide
Epoxide 8=glycidyl ether of largely n-$C_{12}$ and $C_{14}$ alcohols
Epoxide 45=glycidyl ether of largely n-$C_{16}$ and $C_{18}$ alcohols
VCD=4-vinyl cyclohexene dioxide
BDGE=1,4-butanediol diglycidyl ether (49% pure)
DER=diglycidyl ether of bisphenol A
DGEBD=1,3-butanediol diglycidyl ether
ERLA=glycidyl ether of β-(bisglycidyl amino)phenol
UNOX=3,4-epoxycyclohexyl ester of 2-(3,4-epoxycyclohexyl)acetic acid
EPOTUF=triglycidyl ether of 1,1,1-trimethylol propane

TABLE I

| Ex. No. | Prepolymerization | | | | | Polymerization | | | Product | | Isolated product, RSV |
|---|---|---|---|---|---|---|---|---|---|---|---|
| | Catalyst | Monomers | Parts | Hrs. | °C. | Hrs. | °C. | Percent conv. | Appearance | Particle size, μ | |
| Homopolymerization of ECH | | | | | | | | | | | |
| Control 1 | Tibal | | | | | 67 | 30 | 13 | Clear liquid; polymer on vessel walls. | | 0.47 |
| 1 | do | $C_{16-18}$ oxide | 2 | 21 | 30 | 7 | 30 | 31 | White dispersion | <1–5 | 0.42 |
| 2 | Teal I | do | 2 | 21 | 30 | 45 | 30 | | do | <0.6–2 | |
| Copolymerization 90:10 ECH:EO | | | | | | | | | | | |
| Control 2 | Teal II | | | | | 24 | 30 | 64 | Clear solution; polymer on vessel walls. | | 2.7 |
| Control 3 | do | $C_{16-18}$ oxide | 2 | 0 | | 24 | 30 | 47 | do | | 2.1 |
| Control 4 | do | $C_{15-18}$ oxide (pure) | 2 | 4 | 30 | 15 | 65 | 44 | Large particles and polymer on vessel walls. | | 4.1 |
| 3 | do | $C_{15-18}$ oxide | 2 | 4 | 30 | 71 | 30 | 34 | Viscous dispersion | | |
| 4 | do | {$C_{15-18}$ oxide, VCD} | 2, 0.02 | 4 | 30 | 41 | 30 | 27 | Fluid dispersion | <1–10 | |
| 5 | do | {$C_{15-18}$ oxide, BDGE} | 2, 0.08 | 21 | 30 | 4, 47 | 30, 65 | 61 | Dispersion | 1–5 | |
| 6 | Teal III | {$C_{15-18}$ oxide (pure), BDGE} | 2, 0.08 | 23 | 30 | 70 | 65 | 37 | Fluid dispersion | <1–10 | |
| 7 | do | {$C_{15-18}$ oxide, ECH, BDGE} | 1.26, 0.79, 0.02 | 17 | 65 | 24 | 65 | 20 | Viscous dispersion | <1–3 | |
| 8 | do | {$C_{15-18}$ oxide, ECH, DER} | 1.5, 0.5, 0.02 | 2 | 65 | 41 | 65 | 44 | Viscous dispersion | 1–3 | 5.1 |
| 9 | do | {$C_7$ oxide, BDGE} | 1.0, 0.1 | 21 | 30 | 48 | 65 | 45 | Viscous dispersion | 1–5 | 4.3 |
| 10 | do | {$C_7$ oxide, DGEBD} | 2.0, 0.02 | 21 | 30 | 48 | 65 | 39 | Fluid dispersion | 1–5 | 5.4 |
| 11 | do | {$C_7$ oxide, ERLA} | 2.0, 0.02 | 21 | 30 | 48 | 65 | 29 | Fluid dispersion | 1–5 | 5.7 |
| 12 | do | {$C_7$ oxide, UNOX} | 2.0, 0.02 | 21 | 30 | 48 | 65 | 46 | Fluid dispersion | 1–5 | 4.6 |
| 13 | do | {$C_7$ oxide, EPOTUF} | 2.0, 0.02 | 21 | 30 | 48 | 65 | 50 | Fluid dispersion | 1–5 | 3.8 |
| 14 | do | {$C_{16}$ oxide, BDGE} | 2.0, 0.08 | 21 | 30 | 30 | 65 | 35 | Viscous dispersion | 1–5 | 5.8 |
| 15 | do | {Epoxide 8, BDGE} | 2.0, 0.02 | 21 | 30 | 96 | 65 | 44 | Fluid dispersion | <1–2 | 3.4 |
| 16 | do | {Epoxide 45, BDGE} | 2.0, 0.02 | 21 | 30 | 24 | 65 | 25 | Fluid dispersion | <1–2 | 4.0 |
| 17 | do | {3-dodecyl oxetane, BDGE} | 2.0, 0.08 | 21 | 30 | 30 | 65 | 40 | Viscous dispersion | 1–3 | 4.5 |

EXAMPLES 18–21

These examples illustrate the preparation of larger particle slurries in the copolymerization of a 90:10 mixture of epichlorohydrin and ethylene oxide by using a short chain olefin oxide in the prepolymerization for the preparation of the dispersant microgel. The procedure described for Examples 6 and 7 was used except that the prepolymerization reaction was carried out at 30° C. for 21 hours and the main polymerization at 65° C. for 24 hours. The monomers used in the prepolymerization and the final polymer product characteristics are tabulated below:

| Example | Pre monomers [1] | Parts | Percent conv. | Polymer product Appearance | RSV |
|---|---|---|---|---|---|
| 18 | 1-butene oxide | 2.0 | 45 | Small particle slurry | 3.5 |
|  | BDGE | 0.002 |  |  |  |
| 19 | PO | 2.0 | 62 | Large particle slurry | 3.7 |
|  | BDGE | 0.005 |  |  |  |
| 20 | Epoxide 8 | 1.0 | 43 | Viscous grainy dispersion | 5.2 |
|  | ECH | 0.5 |  |  |  |
|  | PO | 0.5 |  |  |  |
|  | BDGE | 0.02 |  |  |  |
| 21 | EHGE | 2.0 | 42 | Viscous grainy dispersion | 4.8 |
|  | BDGE | 0.02 |  |  |  |

[1] PO=propylene oxide; EHGE=2-ethylhexyl glycidyl ether.

EXAMPLES 22–25

These examples illustrate the use of various diluents in the copolymerization of a 90:10 mixture of epichlorohydrin and ethylene oxide. The procedure used was like that of Examples 6 and 7. The monomers used in the prepolymerization reaction were 1.5 parts of 1-dodecene oxide, 0.50 part of epichlorohydrin and 0.02 part of a 49% pure 1,4-butanediol diglycidyl ether. The prepolymerization was carried out at 30° C. for 21 hours and the main polymerization at 30° C. for 117 hours. The diluent used was 69 parts of a commercial heptane boiling at 93–99° C. and containing 52% naphthenes, 45% paraffins, 2% aromatics and 0.6% olefins in Example 22; 76 parts of cyclohexane in Example 23; 70 parts of deodorized kerosene boiling at 208–253° C. in Example 24; and 70 parts of diethyl ether in Example 25. There was obtained a fluid dispersion of polymer in Example 22 having a particle size of <1–5 and a viscous dispersion of polymer having a particle size of <1–3 in Examples 23–25. The copolymer isolated in these examples had an RSV of 3.9; 4.6; 5.4; and 5.4 respectively.

EXAMPLES 26–31

In these examples, the general procedure described for Examples 6 and 7 was used except that there was added phosgene as a chain transfer agent to the prepolymerization reaction in Examples 27–30 and in Example 31 it was added to the polymerization mixture after the prepolymerization reaction. In Table II are set forth the monomers used in the prepolymerization and the amount thereof and the amount of the chain transfer agent together with the reaction conditions and description of the product.

| Ex. | Chain transfer agent | Parts | Percent conv. | Product particle size, μ Range | Avg. |
|---|---|---|---|---|---|
| 32 | Acetic anhydride | 0.2 | 38 | <1–5 | 3 |
| 33 | PCl₃ | 0.28 | 20 | <1–3 | 1 |
| 34 | PCl₅ | 0.4 | 15 | <1–8 | 2 |
| 35 | POCl₃ | 0.3 | 23 | <1–3 | 1 |
| 36 | Acetyl chloride | 0.16 | 44 | <1–3 | 2 |
| 37 | Acetone | 0.12 | 25 | <1–3 |  |
| 38 | Ethylene carbonate | 0.18 | 26 | <1–3 |  |
| 39 | HCl | 0.04 | 23 | <1–3 |  |

EXAMPLES 40–46

These examples illustrate the preparation of polyether dispersions from a variety of epoxide monomers. In Examples 40–45 and the controls, the general procedure described in Example 3 was utilized, and in Example 46 the procedure described in Example 27 was utilized, with the exceptions set forth below. In Examples 40–42, the catalyst used was the same as used in Example 3 (Teal II) except that in Example 41 there was added a second and equal amount of catalyst after 24 hours of polymerization at 65° C. The catalyst used in Examples 43 and 44 was prepared in 100% n-heptane by the procedure used in Example 1 (Tibal), 0.8 part and 4 parts, respectively, based on triisobutylaluminum, respectively. The catalyst used in Example 45 was the same as that used in Example 6 (Teal III) except that the amount used was 0.11 part based on triethylaluminum. There was used 313 parts of n-heptane as the diluent in Example 44 in place of the 63–69 parts used in Examples 40–43 and 46. In Example 45 the diluent was 39 parts of a commercial hydrocarbon diluent having a boiling point of about 240° C. and made up of a mixture of branched aliphatic hydrocarbons with 50% naphthenes.

TABLE II

| Ex. No. | Prepolymerization Monomers | Parts | Hrs. | °C. | Chain Transfer agent | Transfer parts | Polymerization Hrs. | °C. | Percent conv. | Product Appearance | Particle size, μ Range | Avg. | Isolated product, RSV |
|---|---|---|---|---|---|---|---|---|---|---|---|---|---|
| 26 | C₁₅₋₁₈ oxide | 2.0 | 2 | 65 |  |  | 40 | 65 | 45 | Viscous dispersion | 1–3 |  | 4.0 |
|  | DER | 0.02 |  |  |  |  |  |  |  |  |  |  |  |
| 27 | C₁₅₋₁₈ oxide | 2.0 | 2 | 65 | COCl₂ | 0.18 | 40 | 65 | 28 | Very fluid dispersion | <1–3 | 2 | 2.8 |
|  | DER | 0.02 |  |  |  |  |  |  |  |  |  |  |  |
| 28 | C₁₅₋₁₈ oxide | 1.0 | 2 | 65 | COCl₂ | 0.2 | 40 | 65 | 42 | Fluid dispersion | <1–3 | 2 | 2.7 |
|  | DER | 0.04 |  |  |  |  |  |  |  |  |  |  |  |
| 29 | C₁₅₋₁₈ oxide | 1.0 | 2 | 65 | COCl₂ | 0.6 | 40 | 65 | 44 | Fluid dispersion | <1–3 | 1 | 1.1 |
|  | DER | 0.1 |  |  |  |  |  |  |  |  |  |  |  |
| 30 | C₁₅₋₁₈ oxide | 0.5 | 2 | 65 | COCl₂ | 0.6 | 40 | 65 | 37 | Fluid dispersion | <1–6 |  | 1.2 |
|  | DER | 0.05 |  |  |  |  |  |  |  |  |  |  |  |
| 31 | C₁₅₋₁₈ oxide | 0.5 | 2 | 65 | COCl₂ | 0.4 | 17 | 65 | 48 | Fluid dispersion | <1–3 | 1 | 1.3 |
|  | DER | 0.02 |  |  |  |  |  |  |  |  |  |  |  |

EXAMPLES 32–39

In each of these examples, the procedure described in Example 31 was used except that the following chain transfer agents and the indicated amount thereof were used in place of the 0.4 part of phosgene used in that example and the main polymerization reaction was run for 18 hours in Examples 32–38 and 19 hours in Example 39.

The epichlorohydrin-ethylene oxide copolymer produced in Example 40 was isolated by diluting the reaction mixture with ether, separating the ether-insoluble, washing with a 0.5% solution of HCl in 80:20 ether:methanol, then washing neutral with 80:20 ether:methanol and finally with a 0.4% solution of Santonox in ether and drying for 16 hours at 50° C. under vacuum.

The poly(trimethylene oxide) produced in Example 41 was isolated by shortstopping the polymerization by the addition of 1.6 parts of anhydrous ethanol, adding 4 volumes of methanol to precipitate the polymer, collecting the insoluble, washing it first with 0.5% HCl in methanol, then neutral with methanol, then with a 0.1% solution of Santonox in methanol, after which the polymer was dried for 16 hours at 80° C. under vacuum. It was a snappy rubber.

The dispersion of poly(trans-2-butene oxide) produced in Example 43 was colloidal in nature which after shortstopping by the addition of 1.0 part of anhydrous ethanol and standing for one month became a viscous dispersion. The polymer was isolated by adding heptane, washing with 3% aqueous HCl, washing neutral and then separating the heptane-insoluble polymer. This was washed twice with heptane and once with a 0.1% solution of Santonox in heptane. It was a very hard, somewhat waxy, solid.

The poly[bis(chloromethyl)oxetane] produced in Examples 44 and 45 was isolated in the same manner as described for the epichlorohydrin-ethylene oxide copolymer in Examples 3–8. The polymer so obtained in Example 44 was a very fine white powder having a particle size of <1–3μ, average of 1μ, high molecular weight (RSV of 4.4), and was crystalline by X-ray. The polymer obtained in Example 45 was a powder having an RSV of >0.8 and a particle size of 1–5μ, average of 2μ.

The data pertinent to each of these examples is tabulated in Table III. Abbreviations not previously defined are:

TMO=trimethylene oxide
PGE=phenyl glycidyl ether
TBO=trans-2-butene oxide
BCMO=bis(2,2-chloromethyl)oxetane
SO=styrene oxide.

In these examples, except Examples 42, 44 and 45, the RSV was determined on a 0.1% solution in chloroform at 25° C.[1] The RSV of the poly[bis(chloromethyl)oxetane] in Examples 44 and 45 was determined on a 0.1% solution in cyclohexanone at 50° C.[2] The RSV of the poly(phenyl glycidyl ether) in Example 42 was determined on a 0.1% solution in α-chloronaphthalene at 100° C.[3]

A Sutherland reactor with a dry nitrogen atmosphere was charged with 2 l. of anhydrous n-heptane and after purging with nitrogen for 2 hours, there was added 24 g. of a mixture of 15–18 carbon linear 1-olefin oxides, containing about 1% of a terminal diolefin oxide in the same molecular weight range and 44 millimoles of the Teal II catalyst described in Examples 3–5, added as a 0.91 molar solution in toluene. The prepolymerization reaction was carried out for 15 hours at 30° C. with stirring. There was then added as background monomer a mixture of 4.2 g. of ethylene oxide, 55.8 g. of epichlorohydrin and 20 ml. of n-octane.

The reaction mixture was heated to 95° C. and a monomer feed consisting of 32 wt. percent ethylene oxide and 68 wt. percent epichlorohydrin was started at the rate of 0.5 ml. per minute. Additional catalyst was also fed as required. The ethylene oxide and epichlorohydrin content of the reaction mixture was monitored by gas chromatography and the catalyst and monomer feeds were adjusted to keep the ethylene oxide-epichlorohydrin molar ratio of the background monomer mixture the same as that originally added (1:6). A total of 309 g. of ethylene oxide-epichlorohydrin monomer and 175 millimoles of catalyst were fed over 8.5 hours at 95° C. The polymerization wsa shortstopped by adding 3 g. of a 5% solution of the antioxidant, 1,1,3-tris(2-methyl-4-hydroxy-5-tert-butylphenyl)-butane in isopropanol. The product was a pourable dispersion at room temperature that had a total solids content of 22.5% and the average size of the particles was 1–3μ.

The ploymer was isolated from the dispersion by adding 18 g. of the above antioxidant and then 310 g. of a 10% aqueous citric acid solution. The mixture was stirred for 2 hours at 85–100° C., allowed to stand overnight and then was steam coagulated by gradually adding it to a vessel containing a small amount of water with steam sparging through it. After all the dispersion was coagulated, steaming was continued until the solvent was removed, after which the polymer was dried for 16 hours at 80° C. under vacuum. On analysis, it was found to contain 27% chlorine and it had an RSV of 3.6.

The above procedure was repeated except that the $C_{15-18}$ oxide mixture was a pure distilled fraction containing no diepoxide. A dispersion of the polymer was not obtained. Instead, the polymer precipitated in large masses and coated the walls of the reactor.

TABLE III

| Ex. No. | Prepolymerization | | | | Main polymerization | | | | Percent Conv. | Product appearance | Isolated product, RSV |
|---|---|---|---|---|---|---|---|---|---|---|---|
| | Monomers | Parts | Hrs. | °C. | Monomers(s) | Parts | Hrs. | °C. | | | |
| 40 | $C_{15-18}$ oxide | 2.0 | 4 | 30 | ECH | 5 | 41 | 30 | 46 | Viscous dispersion | 2.2 (CF) |
| | | | | | EO | 15 | | | | | |
| 41 | $C_{15-18}$ oxide | 2.0 | 21 | 30 | TMO | 20 | 24 | 30 | 63 | Gel-like dispersion | 13.4 (CF) |
| | | | | | | | 47 | 65 | | | |
| Control | | | | | TMO | 20 | 21 | 30 | 90 | Polymer separated on walls of vessel | 18.4 (CF) |
| | | | | | | | 51 | 65 | | | |
| 42 | $C_{15-18}$ oxide | 2.0 | 4 | 30 | PGE | 20 | 19 | 65 | 50 | Granular dispersion | >1.3 (CN) |
| Control | | | | | PGE | 20 | 19 | 65 | 52 | Polymer separated on walls of vessel | 5.0 (CN) |
| 43 | $C_{15-18}$ oxide | 2.0 | 21 | 30 | TBO | 20 | 53 | 30 | 24 | Clear-colloidal dispersion | 0.38 (CF) |
| 44 | $C_{15-18}$ oxide | 2.5 | 21 | 30 | BCMO | 100 | 8 | 0 | 63 | Paste-like dispersion | 4.4 (CH) |
| Control | | | | | BCMO | 100 | 8 | 0 | 70 | Polymer separated on walls of vessel | |
| 45 | $C_{12}$ oxide | 0.5 | 0.3 | 95 | BCMO | 10 | 45 | 185 | 39 | Fluid dispersion | >0.8 (CH) |
| | DER | 0.006 | | | | | | | | | |
| 46 | $C_{15-18}$ oxide | 2.0 | 2 | 65 | SO | 20 | 20 | 65 | 15 | Fluid dispersion | >0.9 (CN) |
| | DER | 0.02 | | | | | | | | | |

EXAMPLE 47

This example illustrates the process of this invention carried out with a continuous feed of the monomers for the main polymerization.

---
[1] Indicated in the table as CF.
[2] Indicated in the table as CH.
[3] Indicated in the table as CN.

EXAMPLE 48

The procedure of Example 47 was repeated except that there was used in the prepolymerization 79 millimoles of catalyst and it was carried out for 4 hours at 30° C. and the background monomer charged was 7 g. of ethylene oxide and 93 g. of epichlorohydrin. The main polymerization was carried out for 65 hours at 65° C., 620 g. of monomers and 175 millimoles of catalyst being fed into the reaction. There was obtained a good dispersion of polymer containing 26.4% solids. A sample of the polymer was isolated and it had an RSV of 3.3.

A portion (400 ml.) of the dispersion was centrifuged, and washed, by resuspending in heptane, 3 times. The polymer was then resuspended in heptane with an additional amount of the anti-oxidant added (0.2% by weight of the polymer) to give a 37% solids, fluid dispersion. A sample of it was dried to give a rubbery polymer containing 21.4% chlorine and having an RSV of 2.5.

EXAMPLE 49

In this example ethylene oxide was polymerized following the procedure of Example 48 except that the prepolymerization reaction time was 16 hours and no background monomer was added. Ethylene oxide (372 g.) was added at a uniform rate during 7.5 hours at 65° C. The product was a good dispersion having a solids content of 19.5% and a particle size of $<1$ to $5\mu$, the average particle size being $2\mu$. The polymer was isolated from a portion of the dispersion as described in Example 39. It had an RSV of 2.4 as measured on a 0.1% solution in chloroform at 25° C.

EXAMPLE 50

An ethylene oxide-epichlorohydrin copolymer dispersion was prepared following the procedure of Example 47 using in the prepolymerization 38.4 g. of the $C_{15-18}$ oxide, 9.6 g. epichlorohydrin and 1.4 g. of the diglycidyl ether of bisphenol A with 60.5 millimoles of the Teal III catalyst described in Example 6. The prepolymerization reaction was carried out for 0.25 hour at 95° C. The main polymerization was run for 6 hours at 95° C. to 18.9% solids by feeding 199 g. of the monomer mixture and 48 millimoles of added catalyst. There was obtained a good dispersion.

The isolated polymer contained 24.8% chlorine, had an RSV of 3.9 and a Mooney viscosity at 25° F. of 46. It was compounded on a 2-roll mill at 190–210° F. using the following formula:

| | Parts |
|---|---|
| Polymer | 100 |
| Ni dibutyldithiocarbamate | 1 |
| Red lead | 5 |
| Fast extruding furnace black | 50 |
| 2-mercaptoimidazoline | 1.5 |

The compounded rubber showed good mill processability at 190–120° F. and it had a Mooney viscosity of 122. It was compression molded at 310° F. for 60 minutes and had the following properties:

| | Unaged | Aged [1] |
|---|---|---|
| Tensile strength, p.s.i. | 1,680 | 1,810 |
| 100% modulus, p.s.i. | 1,265 | 1,535 |
| Ultimate elongation, percent | 180 | 130 |
| Shore "A" hardness | 79 | 82 |
| Percent swell in ASTM No. 3 oil (72 hours, 25° C.) | 4.5 | |
| Percent swell in water (72 hours, 25° C.) | 4.5 | |

[1] 5 days at 300° F. in an air-circulating oven.

These properties are equivalent to the properties of an ethylene oxide-epichlorohydrin copolymer prepared in a solution process with the same catalyst and of similar Mooney viscosity.

EXAMPLE 51

Example 47 was repeated except that the background monomer mixture contained in addition to the ethylene oxide and epichlorohydrin, 1.07 g. of vinylcyclohexene dioxide. The monomer feed consisted of 29.5% ethylene oxide, 65.5% epichlorohydrin and 5.0% vinylcyclohexene dioxide, a total of 647 g. being fed over 12.5 hours and the polymerization carried out at 65° C. The amount of catalyst fed was 450 millimoles. The dispersion so obtained contained 20% solids and the average particle size of the particles was 1–5$\mu$. A portion of the polymer was separated and analyzed and found to contain 25.6% chlorine. Another portion of the polymer dispersion was centrifuged and the polymer was washed, by resuspending it in heptane, three times. It was then resuspended in n-heptane to give an 18% solids, fluid dispersion having a particle size of 1 to $8\mu$, with an average particle size of $5\mu$. A sample was dried to give a very tough rubber product containing 22.6% chlorine and the percent gel in hot acetone was 62.9%.

The fine particle epichlorohydrin-ethylene oxide copolymer was then separated by filtration and 10 parts of it were melt blended with 90 parts of a commercial polyvinyl chloride. The blend was then compression molded at 190° C. for 4 minutes into a flat sheet from which test specimens were cut and the Izod Impact strength determined. This blend had an Izod Impact of 2.80 ft. lb./in. (notch).

EXAMPLE 52

An ethylene oxide-epichlorohydrin copolymer dispersion was prepared following the procedure of Example 47 using in the prepolymerization 36 g. of dodecene oxide, 12 g. of epichlorohydrin and 1.9 g. of 1,4-butanediol diglycidyl ether with 40 millimoles of the Teal III catalyst described in Example 6. The prepolymerization was carried out for 0.25 hour at 95° C. The main polymerization was run for 6.8 hours at 95° C. to 19% solids by feeding 284 g. of the monomer mixture and 72 millimoles of added catalyst. The product was a good dispersion of 22% solids. After adding 0.1%, by weight of the polymer, of the same antioxidant used in Example 47, the dispersion was centrifuged, the supernatant decanted, the polymer redispersed in n-heptane and again centrifuged. The wet cake was 53% solids and was diluted to 10% by weight solids with n-heptane.

A portion (89 g.) of this 10% dispersion was added to 50 g. of water containing 1.3 g. of a commercial dispersant containing 75% of the dioctyl ester of sodium sulfosuccinic acid in water. The mixture was vigorously stirred for 20 hours with nitrogen blowing over the surface of the mixture to evaporate part of the heptane. There was obtained a smooth, uniform, creamy emulsion. This was stripped under vacuum (14 mm. and 40° C.) for 2 hours with agitation and yielded a milky latex of 6.5% solids.

EXAMPLE 53

Example 47 was repeated except that 48 g. of cis-2-butene oxide was used in place of the $C_{15}$–$C_{18}$ oxide-diolefin oxide mixture used in that example in the prepolymerization which was carried out for 2 hours at 65° C. A total of 288 g. of the ethylene oxide-epichlorohydrin monomer feed and 270 millimoles of catalyst were fed over 10 hours at 65° C. There was obtained a large particle slurry of the polymer of 21% solids, the particles having a size of 1–3 mm. The polymer from a portion of the slurry was isolated and on analysis was found to contain 26.5% chlorine and it had an RSV of 1.4.

EXAMPLE 54

Twenty parts of epichlorohydrin was polymerized following the general procedure of Example 27 for the copolymerization of epichlorohydrin and ethylene oxide, except that the amount of phosgene and catalyst used in the preparation of the microgel was doubled and the pre-reaction was carried out at 95° C. for 15 minutes. After the microgel formation, it was cooled to room temperature and an additional 0.2 part of phosgene and the epichlorohydrin were added. The polymerization was carried out at 95° C. for 4 hours. A very fluid dispersion of 13.5% solids and particle size of $<1$–$2\mu$ was obtained. The percent conversion was 65. The polymer was isolated from a portion of the dispersion by the procedure described in Example 1. It had an RSV of 3.4 and contained 64% crystalline poly(epichlorohydrin) as determined by low temperature crystallization from acetone.

EXAMPLE 55

The catalyst [$(C_8H_{17})_2Mg \cdot 0.4NH_3$] used in this example was prepared by reacting under nitrogen, 0.5 part of dioctylmagnesium in 2.3 parts of diethyl ether with 0.036 part of ammonia in the presence of glass beads by agitating for 20 hours at 30° C. and then heat treating for 19 hours at 90° C.

A polymerization vessel with a nitrogen atmosphere was charged with 1.0 g. of the $C_{15-18}$ oxide containing about 1% diolefin dioxide, 17 g. of n-heptane and an amount of the above catalyst equal to 0.5 g. of dioctylmagnesium. After 4 hours prepolymerization at 30° C., 5.0 g. of ethylene oxide was added and polymerized at 30° C. for 18 hours. The polymer product was a good dispersion. The polymer was isolated from the dispersion as described in Example 40. The polymer had an RSV of 47 as measured on a 0.1% solution in chloroform at 25° C. and was obtained in 100% conversion.

A control where the premonomer and prepolymerization step were omitted gave one large lump of polymer in 90% conversion with an RSV of 41.

EXAMPLE 56

The catalyst [$(C_2H_5)_2Zn \cdot 0.9H_2O$] used in this example was prepared by diluting a 1.5 M solution of diethylzinc with diethyl ether (10 parts of ether per part of diethylzinc) in the presence of glass beads. After cooling to 0° C., 0.016 part of water was added with agitation to an amount of the solution equal to 0.12 part of diethylzinc and the mixture was agitated for 20 hours at 30° C.

A polymerization vessel with a nitrogen atmosphere was charged with 0.5 g. of the $C_{15-18}$ oxide containing about 1% diolefin dioxide, 17 g. of n-heptane and the above catalyst equal to 0.12 part of diethylzinc. After 21 hours prepolymerization at 30° C., 50 g. of ethylene oxide was added and polymerized for 7 hours at 30° C. with good agitation. A good dispersion of poly(ethylene oxide) was obtained. The polymer was isolated as described in Example 40. It had an RSV of 36.7 as measured on a 0.1% solution in chloroform at 25° C. and amounted to a conversion of 62%.

A control where the premonomer and prepolymerization step were omitted gave one large lump of polymer equal to a conversion of 78% and which had an RSV of 11.9.

The process of this invention has many advantages, over and above the obvious advantage of producing a stable polymer dispersion, one of the most important advantages being that it permits polymerization to a higher solids content than can be achieved in solution polymerization and avoids the deposition of the polymer product as a coating on the vessel walls as was previously encountered when attempts were made to carry out the polymerization in nonsolvent diluents.

The polyether dispersions produced in accordance with this invention have a wide variety of uses as such, which use applications will, of course, depend on the polyether involved. For example, the dispersions of epichlorohydrin homo- and copolymers, when formulated to include suitable stabilizers, fillers, plasticizers, cross-linking agents, etc., can be used as protective coatings on metal and other substrates, to impregnate paper, textile fabrics, etc., as binders for nonwovens, as adhesives etc. In the case of the dispersions of the water-soluble polymers such as poly(ethylene oxide) and copolymers containing major amounts of ethylene oxide, the dispersions can be used to provide very rapid solution in water and/or instant thickening of aqueous systems, thereby avoiding the degradation usually involved during the solution of very high molecular weight polymers with prolonged agitation. In such applications, it is sometimes desirable to replace the hydrocarbon dispersion medium with a water-miscible nonsolvent such as acetone, methanol, ethanol, ethylene glycol, glycerine, etc. The fine particle polymers can be separated from the dispersions and used. By this means, it is possible to dry blend the polymers with other materials. This is of particular significance in the case of the elastomeric polyethers such as poly(epichlorohydrin) and epichlorohydrin-ethylene oxide copolymers, which previously have been obtained only in large masses which could not be ground to a sufficiently small particle size. Thus it is possible to blend these fine particle polyethers with other polymers, such as polyvinyl chloride, to increase the impact strength of the latter, by means of simply dry blending techniques and obtain a well dispersed mixture of the two. Many other applications of these fine particle dispersions of polyethers will be apparent to those skilled in the art.

What I claim and desire to protect by Letters Patent is:

1. A dispersion of a solid poly(epoxide) in a nonpolar liquid organic diluent containing a polyether microgel which is swollen at least about 100% by said diluent, said poly(epoxide) being a polymer of at least one monoepoxy monomer selected from the group of oxiranes and oxetanes and mixtures thereof, said polymer being insoluble in said diluent and having a particle size of from about 0.05 micron to about 20 microns, said diluent being one that swells the disperse poly(epoxide) less than about 50% and at least 80% of which diluent is selected from the group consisting of hydrocarbons, monochlorohydrocarbons and aliphatic ethers.

2. The dispersion of claim 1 wherein the poly(epoxide) has a particle size of from about 0.1 micron to about 10 microns.

3. The dispersion of claim 1 wherein the poly(epoxide) is poly(epichlorohydrin).

4. The dispersion of claim 1 wherein the poly(epoxide) is a copolymer of at least 50% epichlorohydrin.

5. The dispersion of claim 1 wherein the poly(epoxide) is a copolymer of 99 to 1% epichlorohydrin and 1 to 99% ethylene oxide.

6. The dispersion of claim 1 wherein the poly(epoxide) is poly[3,3-bis(halomethyl)oxetane].

7. The dispersion of claim 1 wherein the poly(epoxide) is poly(ethylene oxide).

8. The process of preparing a dispersion of a poly(epoxide) in a nonpolar liquid organic diluent in which the poly(epoxide) is insoluble and by which the poly(epoxide) is swollen less than about 50%, at least 80% of said diluent being selected from hydrocarbons, monochlorohydrocarbons and aliphatic ethers, which comprises polymerizing at least one epoxide selected from the group consisting of oxiranes and oxetanes by contacting said epoxide with at least a catalytic amount of an epoxide polymerization catalyst in said nonpolar liquid organic diluent in the presence of from about 0.5 to about 25% by weight of a polyether microgel which is swollen at least about 100% by said diluent.

9. The process of claim 8 wherein the polyether microgel is a copolymer of a monoepoxy monomer with from 0.5 to 30% of a polyepoxy monomer, said monoepoxy monomer being selected from oxiranes and oxetanes containing one epoxy group, at least 50% of said monoepoxy monomer being selected from olefin monoxides containing at least 3 carbon atoms, glycidyl or oxetanyl ethers of alcohols containing at least 3 carbon atoms or of phenols, and hydrocarbyl-substituted oxetanes wherein the total number of carbons is at least 4 and said polyepoxy monomer being selected from oxetanes and oxiranes containing at least two epoxy groups.

10. The process of claim 8 wherein the polyether microgel is a stereoblock polymer of an oxirane.

11. The process of claim 9 which comprises the steps of:

(1) preparing a polyether microgel by copolymerizing at least one monoepoxy monomer, at least 50% of said monoepoxy monomers being selected from olefin monoxides containing at least 3 carbon atoms, glycidyl or oxetanyl ethers of alcohols containing at least 3 carbon atoms or of phenols, and hydrocarbyl-substituted oxetanes wherein the total number of carbons is at least 4, with from about 0.05% to about 30% by weight of the monoepoxy monomer of at least one polyepoxy monomer by contacting a mixture of said mono- and poly-epoxy monomers with at least a catalytic amount of an epoxide polymerization catalyst in a nonpolar liquid organic diluent, said polyepoxy monomer being a compound containing at least two epoxide groups selected from oxirane and oxetane groups, and (2) adding to the microgel-diluent-catalyst mixture produced in (1), at least one monoepoxy monomer and polymerizing said monomer in the presence of said microgel until an amount of said monomer at least 4 times the weight of the microgel in the microgel-diluent-catalyst mixture has been polymerized, said monoepoxy monomer being selected from oxiranes, oxetanes and mixtures thereof.

12. The process of claim 11 wherein the epoxide monomer polymerized in (2) is a mixture of at least 50% by weight of epichlorohydrin and the remainder is a different oxirane.

13. The process of claim 11 wherein the epoxide monomer polymerized in (2) is epichlorohydrin.

14. The process of claim 12 wherein the different oxirane is ethylene oxide.

15. The process of claim 11 wherein the epoxide monomer polymerized in (2) is ethylene oxide.

16. The process of claim 11 wherein the mono-epoxide polymerized in (2) is a mixture of at least 50% by weight of 3,3-bis(halomethyl)oxetane and the remainder is a different epoxide.

17. The process of claim 11 wherein the mono-epoxide polymerized in (2) is 3,3-bis(chloromethyl)oxetane.

18. The process of claim 11 wherein the monomers copolymerized in (1) comprise a 1-olefin oxide containing from 6 to 30 carbon atoms and a diterminal olefin dioxide containing from 4 to 30 carbon atoms.

19. The process of claim 11 wherein the monomers copolymerized in (1) comprise a 1-olefin oxide containing from 6 to 30 carbon atoms and a diglycidyl ether of a polyhydric phenol.

20. The process of claim 11 wherein the monomers copolymerized in (1) comprise an alkyl glycidyl ether, wherein the alkyl group contains at least 3 carbon atoms, and a diglycidyl ether of an alkylene glycol.

References Cited

UNITED STATES PATENTS

| | | | |
|---|---|---|---|
| 3,317,635 | 5/1967 | Osmond | 260—34.2 |
| 3,383,337 | 5/1968 | Garling et al. | 260—34.2 |
| 3,405,087 | 10/1968 | Fryd | 260—33.6 |

ALLAN LIEBERMAN, Primary Examiner

U.S. Cl. X.R.

117—132 BE, 155 R, 161 ZB; 260—33.6 EP, 33.8 EP, 34.2